(12) United States Patent
Bombardo

(10) Patent No.: US 10,252,334 B1
(45) Date of Patent: Apr. 9, 2019

(54) LASER SINTERING SYSTEM AND METHOD

(71) Applicant: James J. Bombardo, Elko, MN (US)

(72) Inventor: James J. Bombardo, Elko, MN (US)

( * ) Notice: Subject to any disclaimer, the term of this patent is extended or adjusted under 35 U.S.C. 154(b) by 516 days.

(21) Appl. No.: 14/935,402

(22) Filed: Nov. 7, 2015

(51) Int. Cl.
*B22F 3/105* (2006.01)
*B33Y 10/00* (2015.01)
*B33Y 30/00* (2015.01)

(52) U.S. Cl.
CPC ............ *B22F 3/1055* (2013.01); *B33Y 10/00* (2014.12); *B33Y 30/00* (2014.12)

(58) Field of Classification Search
CPC ........ B22F 3/1055; B33Y 10/00; B33Y 30/00
See application file for complete search history.

(56) References Cited

U.S. PATENT DOCUMENTS

2005/0263933 A1* 12/2005 Welch, IV ............. B33Y 30/00 264/113
2009/0255912 A1* 10/2009 Dietrich .............. B29C 67/0085 219/121.86

* cited by examiner

*Primary Examiner* — Jacob T Minskey
*Assistant Examiner* — Melody Tsui
(74) *Attorney, Agent, or Firm* — Dave Alan Lingbeck

(57) ABSTRACT

A laser sintering system and method for speeding up and reducing the cost of the build platen process also because of the interchangeability of the size in the build chamber which allows for greatly reduced cost of power materials that are required when loading the machine. The laser sintering system and method includes a build assembly including a build chamber base and a plate in communication with the build chamber base; and a wiper assembly including a planar member with opposed ends and movable bi-directionally upon the plate and having a material mover attached to the planar member.

3 Claims, 3 Drawing Sheets

LASER SINTERING SYSTEM AND METHOD

FIELD OF THE INVENTION

The present invention relates to sintering systems and more particularly pertains to a new laser sintering system and method for speeding up and reducing the cost of the build platen process.

DESCRIPTION OF THE PRIOR ART

The use of sintering systems is known in the prior art. More specifically, sintering systems heretofore devised and utilized are known to consist basically of familiar, expected and obvious structural configurations, notwithstanding the myriad of designs encompassed by the crowded prior art which have been developed for the fulfillment of countless objectives and requirements.

The prior art includes an apparatus and method for producing parts by fusing selected portions of a layer of powder at a target area, including the systems for delivering the powder to the target area, is disclosed. Multiple powder pistons are included in the apparatus, each of which lift a volume of powder above a surface in an alternating manner relative to one another. Powder delivery begins by the lifting of a volume of powder at a first location on one side of the target area. A counter-rotating roller moves across the lifted powder, distributes it over the target area, and rests beyond a second powder lifting location on the other side of the target area. Another prior art includes an apparatus and method for producing parts by selective laser sintering. The disclosed method selectively sinters a first layer of heat-fusible powder by directing a laser beam so that it scans the first layer in a first direction to sinter a first cross-section of the part. A second layer of the heat-fusible powder is then disposed over the first layer, and the next cross-section of the part is selectively sintered by the laser being scanned in a different direction from the first direction. Also another prior art includes a method and apparatus for selectively sintering a layer of powder to produce a part comprising a plurality of sintered layers. The apparatus includes a computer controlling a laser to direct the laser energy onto the powder to produce a sintered mass. The computer either determines or is programmed with the boundaries of the desired cross-sectional regions of the part. For each cross-section, the aim of the laser beam is scanned over a layer of powder and the beam is switched on to sinter only the powder within the boundaries of the cross-section. While these devices fulfill their respective, particular objectives and requirements, the aforementioned patents do not disclose a new laser sintering system and method.

SUMMARY OF THE INVENTION

The general purpose of the present invention, which will be described subsequently in greater detail, is to provide a new laser sintering system and method which has many of the advantages of the sintering systems mentioned heretofore and many novel features that result in a new laser sintering system and method which is not anticipated, rendered obvious, suggested, or even implied by any of the prior art sintering systems, either alone or in any combination thereof. The present invention may include a build assembly including a build chamber base and a plate in communication with the build chamber base; and a wiper assembly including a planar member with opposed ends and movable bi-directionally upon the plate and having a material mover attached to the planar member. None of the prior art includes the combination of the elements of the present invention.

There has thus been outlined, rather broadly, the more important features of the laser sintering system and method in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

It is an object of the present invention to provide a new laser sintering system and method which has many of the advantages of the sintering systems mentioned heretofore and many novel features that result in a new laser sintering system and method which is not anticipated, rendered obvious, suggested, or even implied by any of the prior art sintering systems, either alone or in any combination thereof.

Still another object of the present invention is to provide a new laser sintering system and method for speeding up and reducing the cost of building the parts.

Still yet another object of the present invention is to provide a new laser sintering system and method that eliminates the waste of the powder used to build the parts.

Even still another object of the present invention is to provide a new laser sintering system and method that has a variable size piston and adapters to form and build different size parts.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DETAILED DESCRIPTION OF THE INVENTION

Figure 1:
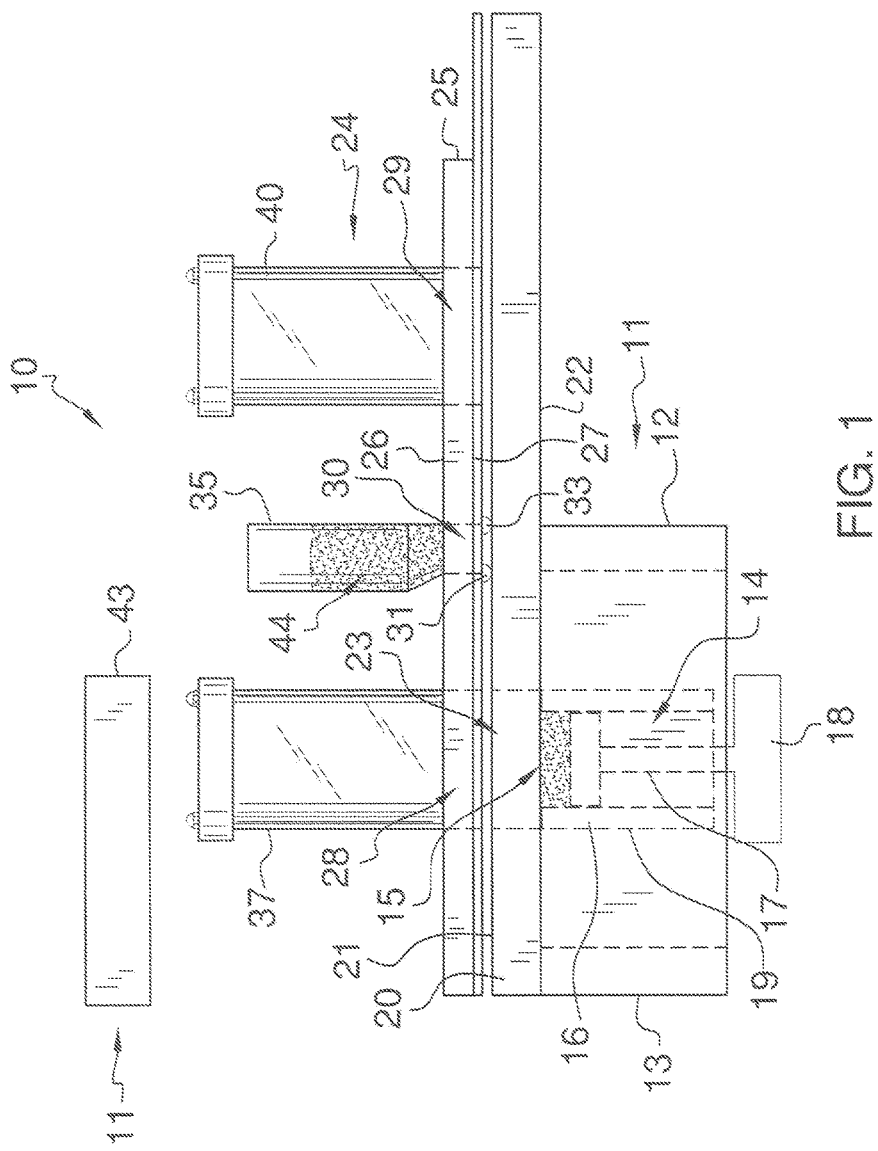
FIG. 1 is an exploded perspective view of a new laser sintering system according to the present invention.
Figure 2:
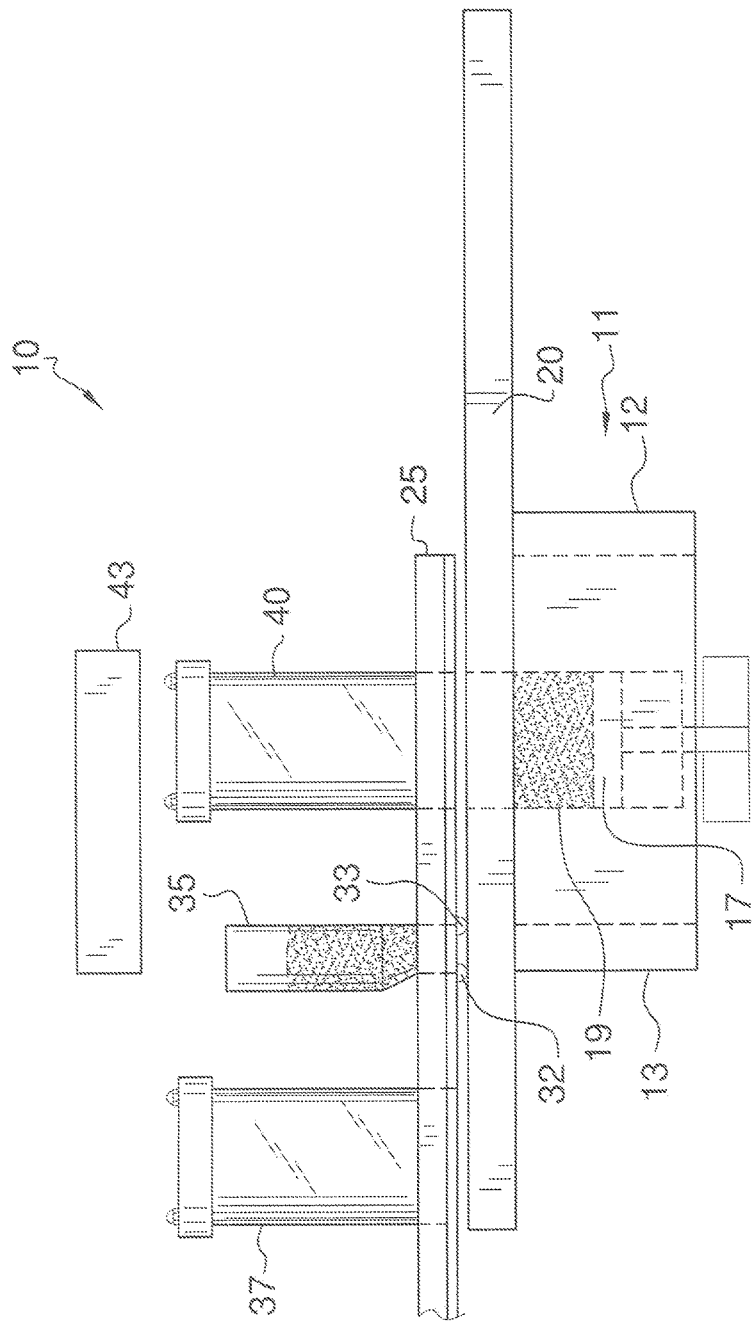
FIG. 2 is a side elevation view of the present invention.
Figure 3:
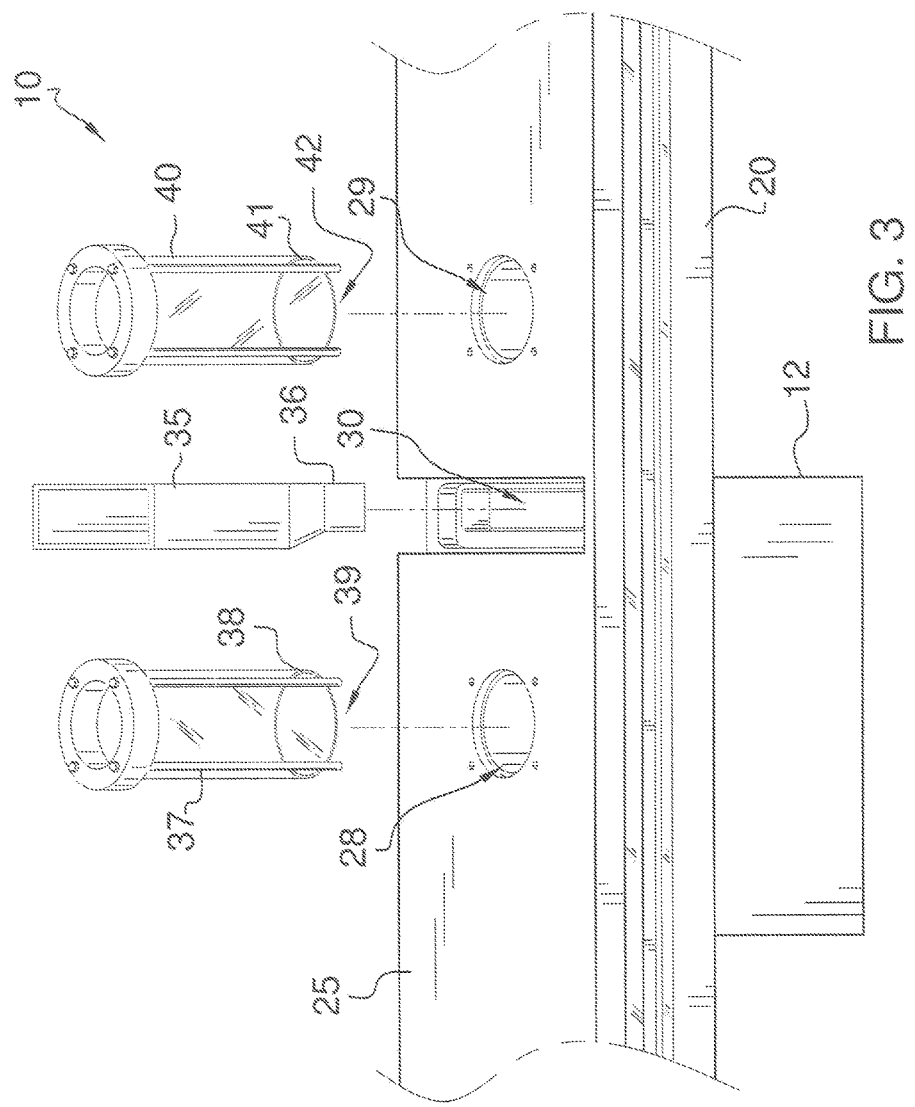
FIG. 3 is another side elevation view of the present invention showing movement of the wiper plate.

With reference now to the drawings, and in particular to FIGS. 1 through 3 thereof, a new laser sintering system and method embodying the principles and concepts of the present invention and generally designated by the reference numeral 10 will be described.

As best illustrated in FIGS. 1 through 3, the laser sintering system 10 may comprise a build assembly 11 including a rigid build chamber base 12 and a plate 20 in communication with the build chamber base 12 with the plate 20 made of suitable material and conventionally mounted upon the build chamber base 12; and may also comprise a wiper assembly 24 including a planar member 25 with opposed ends and movable bi-directionally upon the plate 20 and having material mover 31, 33 conventionally attached to the planar member 25.

As illustrated in FIGS. 1 and 2, the build chamber base 12 may have a side wall 13 and a chamber 14 with an opening 15 therein. The chamber 14 may be size-alterable with structural material 16 removably and conventionally disposed in the chamber 14 and engagable to an inner side 19 of the side wall 13 to alter the size of the chamber 14. The build assembly 11 may further include a piston 17 interchangeably and movably disposed in the chamber 14 and adapted to be in conventional communication with a power source 18 for fabricating objects during a laser sintering process. The plate 20 may have a top side 21 and a bottom side 22 and may also have an aperture 23 disposed laterally through the top and bottom sides 21, 22 with the aperture 23 being in vertical alignment with the opening 15 into the chamber 14. The plate 20 may be slanted towards the aperture 23 to facilitate movement of the structural material. The build assembly 11 may further include a laser member 43 conventionally suspended above the planar member 25 and in vertical alignment with the aperture 23 through the plate 20 and the opening 15 in the chamber 14 for fusing powder material 44 into selected objects.

As shown in FIGS. 1-3, the planar member 25 may have a top side 26 and a bottom side 27 with openings 28-30 spaced apart and disposed through the top and bottom sides 26-27 of the planar member 25. The openings 28-30 may include a first opening 48 disposed near one of the opposed ends of the planar member 25, a second opening 29 disposed near another of the opposed ends of the planar member 25, and a third opening 30 disposed between the first and second openings 28-29. The material mover 31, 33 may be wiper members 31, 33 made of any suitable material such as a elastomeric polymer and conventionally attached to the bottom side 27 of the planar member 25 and bi-directionally movable upon the top side 21 of the plate 20 to move the powder material 44 deposited upon the top side 21 of the plate 20. The wiper members 31, 33 may be disposed adjacent to the third opening 30 with one of wiper members 31 having at least a portion 32 disposed between the first opening 28 and the third opening 30 and with another of the wiper members 33 having at least a portion 34 disposed between the second opening 29 and the third opening 30.

As illustrated in FIGS. 1-3, the wiper assembly 24 may also include a rigid hopper 35 made of suitable material and removably disposed upon the planar member 25 and upon the third opening 30 with a bottom portion 36 conventionally disposed and received in the third opening 30 for containing the powder material 44 and for dispensing the powder material 44 through the third opening 30 and onto the plate 20. The wiper assembly 24 may further include first and second hollow cylindrical transparent containers 37, 40 each having a bottom portion 38, 41 and an open bottom 39, 42 and interchangeably disposed upon the planar member 25 and a upon respective first and second openings 28-29 with the bottom portion 38, 41 removably and conventionally retained in a respective first and second openings 28-30 to capture inert gases used in the laser sintering process.

In use, the powder material 44 may be deposited in a build puck which is interchangeably positioned in the build chamber base 12 with the powder material 44 conventionally dispensed from the hopper 35 onto the plate 20 through the third opening 30 and the planar member 25 moved upon the plate 20 in a direction such that the wiper members 31, 33 move and sweep the powder material 44 into the build puck. The planar member 25 is conventionally moved either manually or mechanically such that the first transparent container 37 is aligned over the build chamber base 12. The laser member 43 suspended above the build chamber base 12 is used to fuse the powder material 44 in the build puck to form a desired object which is then removed from the build chamber base 12. Inert gas which generated during the fusion process is captured into the first transparent containers 37. More powder material 44 is conventionally dispensed from the hopper 35 onto the plate 20 and the planar member 25 is conventionally moved in an opposite direction such that the wiper members 31, 33 move the powder material 44 into the build puck and the second transparent containers 40 is aligned over the build chamber base 12 and the laser member 43 is used to fuse the powder material 44 to form the intended object and the inert gas generated is captured into the second transparent container 40.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the laser sintering system and method. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A laser sintering system comprising:
(1) a build assembly including a build chamber base and a plate in communication with the build chamber base, wherein the build chamber base has a side wall and a chamber with an opening therein, wherein the plate has a top side and a bottom side with an aperture disposed laterally through the top and bottom sides in vertical alignment with the opening into the chamber, wherein the top side of the plate is slanted towards the aperture to facilitate movement of structural material; and
(2) a wiper assembly including a planar member movable bi-directionally upon the top side of the plate and a material mover attached to the planar member, wherein the planar member has a top side and a bottom side with openings spaced apart and disposed through the top and bottom sides of the planar member, wherein the openings include a first opening, a second opening, and a third opening disposed between the first and second openings, and wherein the material mover includes a plurality of wiper members attached to the bottom side of the planar member and bi-directionally movable upon the top side of the plate to move powder material deposited upon the top side of the plate.

2. The laser sintering system as described in claim 1, wherein the wiper members are disposed adjacent to the third opening with one of the wiper members having at least a portion disposed between the first opening and the third opening and with another of the wiper members having at least a portion disposed between the second opening and the third opening.

3. A laser sintering system comprising:

(1) a build assembly including a build chamber base and a plate in communication with the build chamber base, wherein the build chamber base has a side wall and a chamber with an opening therein, wherein the plate has a top side and a bottom side with an aperture disposed laterally through the top and bottom sides in vertical alignment with the opening into the chamber, wherein the top side of the plate is slanted towards the aperture to facilitate movement of structural material; and (2) a wiper assembly including a planar member movable bi-directionally upon the top side of the plate and a material mover attached to the planar member, wherein the planar member has a top side and a bottom side with first and second openings spaced apart and disposed through the top and bottom sides of the planar member, wherein the wiper assembly further includes first and second hollow transparent containers each having a bottom portion and an open bottom, wherein the first and second hollow transparent containers are interchangeably disposed upon the planar member, wherein the bottom portions of the first and second hollow transparent containers are removably retained in the first and second openings of the planar member, and wherein the first and second hollow transparent containers are configured to capture inert gases used in a laser sintering process.

\* \* \* \* \*